A. L. BRICKNELL.
Joining the Ends of Lead-Pipe.

No. 199,180. Patented Jan. 15, 1878.

Attest:
Fred Benjamin

Inventor
Augustus Lea Bricknell
By his attorney
Charles E. Foster

UNITED STATES PATENT OFFICE.

AUGUSTUS L. BRICKNELL, OF LONDON, ENGLAND, ASSIGNOR TO GEORGE WALCOTT GILLETT, OF NEW YORK, N. Y.

IMPROVEMENT IN JOINING THE ENDS OF LEAD PIPES.

Specification forming part of Letters Patent No. 199,180, dated January 15, 1878; application filed October 19, 1877.

*To all whom it may concern:*

Be it known that I, AUGUSTUS LEA BRICKNELL, a citizen of London, England, at present residing in the city, county, and State of New York, have invented certain new and useful Improvements in Joining the Ends of Lead Pipes to each other, which improvements are fully set forth in the following specification, of which the accompanying drawings form a part.

The object of this invention is to make a thoroughly reliable well-shaped joint quickly and economically, without the use of fire, solder, couplers, or other dangerous or costly elements or materials; and I accomplish this by first driving a suitably-shaped cylindrical hardwood or metal plug into the bore of each pipe, whereby the end of each of them is slightly enlarged, so as to admit of the insertion of about half the length of a short, thin, hard-metal tube, having, by preference, circular grooves or threads or other projections provided upon and around the whole or part of its outer surface. The end of each pipe having been thus enlarged, it is found that the lead composing the enlarged part has become somewhat thinner by the process of enlargement, and it hence becomes advisable to strike a few blows endwise on the enlarged end of the pipe, or, by other means, to "upset," or cause a slight thickening of the part to compensate for the previous thinning, and also to provide sufficient metal to fill the grooves or projections on the tube, and to form a flange and shoulders on the outside of the joint when subjected to pressure, as hereinafter explained.

The process of upsetting or thickening somewhat reduces the diameter and shortens the length of the bore of the enlarged part. It is, however, readily restored to the proper size to receive the tube by a second insertion of the plug. The ends of pipes to be joined are next rasped or scraped clean and bright on their faces. The tube is inserted about half-way into each of them, and by suitable mechanical appliances they are pressed into contact until they are welded together, being united by cohesion, forming a continuous homogeneous pipe. The mechanical appliance I prefer to use will be better understood by reference to the drawings, in which—

Figure 1:
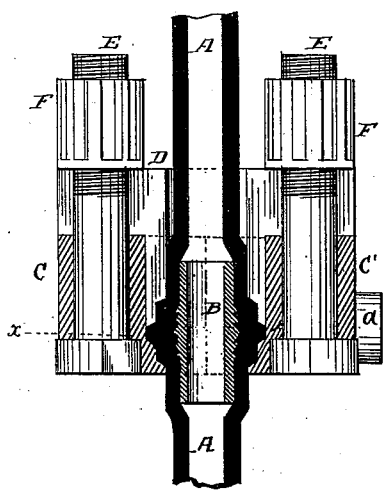
Figure 2:
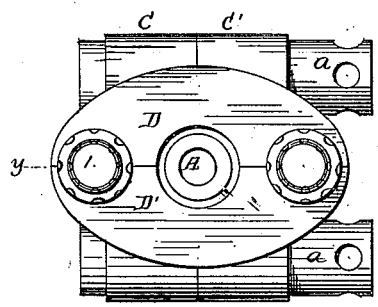

Figure 1 is a longitudinal vertical section of mechanism employed in coupling the pipes; Fig. 2, a plan view, and Fig. 3 a view showing a soft-metal coupling.

A A are two lead pipes, welded together at an imaginary horizontal line, $x$, passing through the center of the flanged part of the welded joint. B represents the internal tube with half its length inserted in each of the lead pipes, and provided with the grooves, which I prefer to form around it. C C' are the two halves of an outer die, held together by two longitudinal horizontal connecting-bolts, $a\ a$, one on each side. (Shown in Fig. 2 of the drawings.) D D' represent the inner die, also divided vertically into two halves on a line, $y$, which would pass through the power-bolts E E. The outer and inner dies, with the two connecting and two power-bolts and their respective nuts, constitute the press.

Power applied to the nuts F F forces the inner die D downward upon the thickened ends of the lead pipes, and effects the operation of cold-welding by pressure, as will be readily understood. The nuts are most conveniently turned, particularly in confined spaces, by ratchet-wrenches, which hold in vertical grooves or notches provided around the nuts for that purpose; and as the power-bolts are cut with right and left hand threads, respectively, the wrenches react upon each other, which dispenses with the necessity for holding the press, and saves the lead pipe from torsional strain.

When the joint has been welded, the dies, being in halves, are easily removed.

It will be seen that however rough and unsightly the thickened ends of pipes may be previous to pressure, the effect of it is to produce a beautifully smooth and uniform appearance to the outside of the joint, corresponding to the interior form of the die or press used. At the same time all the grooves or projections on the outside of the internal hard-metal tube become solidly filled with lead.

The particular office of the tube is to resist the inward yielding of the lead to the force exerted upon it outwardly by the press, and thus compel the lead to receive a much greater pressure than it could otherwise possibly sustain. The grooves or projections on the tube materially aid this result by retarding the escape of the lead from the flanged part of the joint longitudinally between the tube and the press. The use of the tube, which has the same internal diameter as the pipe, also maintains a full and undiminished bore or waterway.

Figure 3:
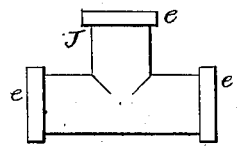

For the purpose of joining lead pipes at an angle to others, I cast short and compact T or other suitably shaped junction or branch pipes of lead, J, Fig. 3, and proceed as before explained, except that, as such pipes may be cast with enlarged and thickened ends $e$, it is not necessary to prepare them by enlarging and thickening, as in the case of ordinary lead pipes.

These lead castings may be conveniently made in small iron molds fitted with iron cores, which can easily be removed. Such molds may be arranged to receive the ends of taps and such like fittings, which may thus be cast into the lead junction-pipes. In some cases a small ring or short piece of lead pipe may be cast around a fitting at a distance from its end sufficient to allow of its projecting into a lead pipe far enough to form a substitute or equivalent for the internal tube. When this is done the part of the fitting so projecting should be grooved to imitate the tube it represents. If a fitting is previously tinned at the part upon which it is intended to cast the lead, the latter becomes most firmly attached to the fitting, and when welded to a lead pipe, as described, an extremely solid and reliable combination is the result. A final stop or end to a pipe may be a flanged cap or socket of lead welded on the end of a pipe over the interior tube, in like manner as two pipes are joined.

Having thus described my invention, I wish it to be understood that I do not desire to confine myself to an internal tube having grooves or projections upon it. The same may be smooth upon its surface; but repeated experiments have demonstrated the great superiority for the purpose specified of a tube with grooves as described.

It will be apparent that other devices may be used for compressing the pipes end to end, and that cams, wedges, &c., may be substituted for the power-screws for drawing the two parts of the dies together. I therefore do not limit myself to the use of the particular tool described, although I have found it very effective.

I do not here claim the soft-metal union or coupling J, as it may form the subject of another application for Letters Patent; but

I claim—

1. The within-described process of uniting soft-metal pipes—that is to say, by placing them with their ends in contact, and then forcing them together until united by cohesion, forming a continuous homogeneous pipe, as set forth.

2. The tool for uniting the ends of soft-metal pipes by pressure, consisting of two sections, each embracing the end of one of the pipes, and power-screws, or equivalent devices, for drawing the sections together.

3. The combination of the die C C′, in two parts, clamped together, the inner die D D′, in two parts, and power-screws, substantially as and for the purpose set forth.

4. A pipe-joint consisting of two pipes of soft metal united by cohesion, end to end, forming one continuous homogeneous pipe around a central short tube, B, as described.

AUGUSTUS LEA BRICKNELL.

Witnesses:
J. PYNE,
JOS. PHILLIPS.